United States Patent
Wang

(10) Patent No.: US 10,649,631 B2
(45) Date of Patent: *May 12, 2020

(54) METHOD AND APPARATUS FOR ADDING ICON TO INTERFACE OF ANDROID SYSTEM, AND MOBILE TERMINAL

(71) Applicant: Huawei Device Co., Ltd., Dongguan (CN)

(72) Inventor: Pei Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 118 days.

This patent is subject to a terminal disclaimer.

(21) Appl. No.: 15/154,154

(22) Filed: May 13, 2016

(65) Prior Publication Data

US 2016/0253073 A1 Sep. 1, 2016

Related U.S. Application Data

(63) Continuation of application No. 13/662,463, filed on Oct. 27, 2012, now Pat. No. 9,372,594, which is a
(Continued)

(30) Foreign Application Priority Data

Apr. 28, 2010 (CN) .......................... 2010 1 0166490

(51) Int. Cl.
*G06F 3/0481* (2013.01)
*G06F 3/0482* (2013.01)
(Continued)

(52) U.S. Cl.
CPC .......... *G06F 3/0483* (2013.01); *G06F 3/0482* (2013.01); *G06F 3/04817* (2013.01);
(Continued)

(58) Field of Classification Search
CPC .... G06F 3/0485; G06F 3/0486; G06F 3/0488; G06F 3/0482; G06F 3/04817;
(Continued)

(56) References Cited

U.S. PATENT DOCUMENTS 5,548,692 A * 8/1996 Cok .................. G06T 11/60
345/667
5,638,438 A 6/1997 Keen
(Continued)

FOREIGN PATENT DOCUMENTS

| CN | 1534511 A | 10/2004 |
|----|-----------|---------|
| CN | 1819685 A | 8/2006 |

(Continued)

OTHER PUBLICATIONS

IPhone User Guide for iPhone OS 3.1 Software, Sep. 9, 2009, pp. 25-26.*

(Continued)

*Primary Examiner* — Nicholas Ulrich
(74) *Attorney, Agent, or Firm* — Leydig, Voit & Mayer, Ltd.

(57) ABSTRACT

A method for adding an icon to an interface of an Android system, where the Android system has N interfaces, includes: a. obtaining add command information; b. obtaining, according to the add command information, space information of an icon to be added; c. obtaining remaining space information of an $M^{th}$ interface according to the add command information; d. judging whether the space information of the icon to be added is greater than the remaining space information of the $M^{th}$ interface; if yes, executing step e; if no, executing step f; e. judging whether the $M^{th}$ interface is a last interface to be judged; if yes, executing step g; if no, assigning M+1 to M and returning to step c; f adding the icon to the interface; and g. establishing another (Continued)

interface, and adding the icon to the newly established interface; where M and N are natural numbers, and 1≤M≤N.

14 Claims, 4 Drawing Sheets

Related U.S. Application Data continuation of application No. PCT/CN2011/073430, filed on Apr. 28, 2011.

(51) Int. Cl.
| | | |
|---|---|---|
| *G06F 3/0484* | (2013.01) | |
| *G06F 3/0483* | (2013.01) | |
| *G06F 9/451* | (2018.01) | |
| *H04M 1/725* | (2006.01) | |
| *G06F 3/0488* | (2013.01) | |

(52) U.S. Cl.
CPC .......... *G06F 3/04842* (2013.01); *G06F 9/451* (2018.02); *H04M 1/72583* (2013.01); *G06F 3/0488* (2013.01)

(58) Field of Classification Search
CPC .... G06F 3/04842; G06F 9/451; G06F 3/0483; H04M 1/72583
See application file for complete search history.

(56) References Cited

U.S. PATENT DOCUMENTS

| | | | |
|---|---|---|---|
| 6,556,217 | B1 | 4/2003 | Maekipaa |
| 6,781,575 | B1 | 8/2004 | Hawkins |
| 7,126,606 | B2 | 10/2006 | Beda |
| 7,263,668 | B1 | 8/2007 | Lentz |
| 7,761,812 | B2 | 7/2010 | Ostojic |
| 8,984,388 | B2 | 3/2015 | Seo et al. |
| 9,052,927 | B2 | 6/2015 | Baek |
| 9,298,347 | B2 | 3/2016 | Roh |
| 9,372,594 | B2 | 6/2016 | Wang |
| 2005/0177799 | A1* | 8/2005 | Knight .............. G06F 9/451 715/810 |
| 2007/0011689 | A1 | 1/2007 | Hiraoka |
| 2007/0157081 | A1 | 7/2007 | Hara |
| 2007/0157089 | A1 | 7/2007 | Van Os |
| 2007/0288843 | A1 | 12/2007 | Makino |
| 2008/0034291 | A1 | 2/2008 | Anderson |
| 2008/0168401 | A1 | 7/2008 | Boule et al. |
| 2008/0184112 | A1* | 7/2008 | Chiang .............. G06F 3/04817 715/700 |
| 2009/0024944 | A1 | 1/2009 | Louch |
| 2009/0037605 | A1 | 2/2009 | Li |
| 2009/0089668 | A1 | 4/2009 | Magnani |
| 2009/0089692 | A1 | 4/2009 | Morris |
| 2009/0138827 | A1 | 5/2009 | Van Os et al. |
| 2009/0150541 | A1 | 6/2009 | Georgis |
| 2009/0158167 | A1 | 6/2009 | Wang |
| 2009/0178008 | A1* | 7/2009 | Herz .............. G06F 3/04817 715/840 |
| 2009/0199126 | A1 | 8/2009 | Kumar |
| 2009/0228824 | A1 | 9/2009 | Forstall |
| 2009/0259958 | A1 | 10/2009 | Ban |
| 2009/0280863 | A1 | 11/2009 | Shin |
| 2009/0300146 | A1 | 12/2009 | Park |
| 2009/0313567 | A1 | 12/2009 | Kwon |
| 2010/0011304 | A1 | 1/2010 | Van Os |
| 2010/0070931 | A1 | 3/2010 | Nichols |
| 2010/0088597 | A1* | 4/2010 | Shin .............. G06F 8/38 715/704 |
| 2010/0115434 | A1 | 5/2010 | Yagi |
| 2010/0223563 | A1 | 9/2010 | Green |
| 2010/0295789 | A1* | 11/2010 | Shin .............. G06F 1/1626 345/168 |
| 2010/0312838 | A1* | 12/2010 | Lyon .............. G06Q 10/109 709/206 |
| 2011/0022575 | A1 | 1/2011 | Tomkins |
| 2011/0061010 | A1* | 3/2011 | Wasko .............. G06F 3/0482 715/769 |
| 2011/0072492 | A1 | 3/2011 | Mohler |
| 2011/0271182 | A1 | 11/2011 | Tsai |
| 2012/0030628 | A1 | 2/2012 | Lee |
| 2012/0036459 | A1 | 2/2012 | Pei |
| 2012/0054663 | A1 | 3/2012 | Baek et al. |
| 2012/0072871 | A1 | 3/2012 | Seo |
| 2012/0084692 | A1 | 4/2012 | Bae |
| 2012/0304084 | A1 | 11/2012 | Kim |
| 2012/0311466 | A1 | 12/2012 | Kluttz |
| 2012/0311485 | A1 | 12/2012 | Caliendo, Jr. |
| 2013/0050119 | A1 | 2/2013 | Nemoto |
| 2013/0139109 | A1 | 5/2013 | Kim |
| 2013/0151983 | A1 | 6/2013 | Lovitt |
| 2013/0167065 | A1 | 6/2013 | Chen |
| 2013/0167072 | A1 | 6/2013 | Ari |
| 2013/0187866 | A1 | 7/2013 | Kim |
| 2013/0219335 | A1 | 8/2013 | Zhang |
| 2013/0268895 | A1 | 10/2013 | Yamaki |
| 2013/0305187 | A1 | 11/2013 | Phillips |
| 2013/0311920 | A1 | 11/2013 | Koo |
| 2014/0013254 | A1 | 1/2014 | Hosein |
| 2014/0068477 | A1 | 3/2014 | Roh |
| 2014/0232739 | A1 | 8/2014 | Kim |
| 2014/0237376 | A1 | 8/2014 | Cassano |
| 2015/0212691 | A1 | 7/2015 | Wang |
| 2016/0357383 | A1 | 12/2016 | Cummins et al. |

FOREIGN PATENT DOCUMENTS

| | | |
|---|---|---|
| CN | 101025761 A | 8/2007 |
| CN | 101223497 A | 7/2008 |
| CN | 101233573 A | 7/2008 |
| CN | 101329611 A | 12/2008 |
| CN | 101329656 A | 12/2008 |
| CN | 101453469 A | 6/2009 |
| CN | 101606125 A | 12/2009 |
| CN | 101627360 A | 1/2010 |
| CN | 101667098 A | 3/2010 |
| CN | 101833418 A | 9/2010 |
| CN | 101853158 A | 10/2010 |
| CN | 102377876 A | 3/2012 |
| CN | 102436335 A | 5/2012 |
| CN | 102880398 A | 1/2013 |
| EP | 0427264 B1 | 6/1997 |
| EP | 1988447 A1 | 11/2008 |
| EP | 2124142 A1 | 11/2009 |
| EP | 2423810 A1 | 2/2012 |
| JP | H10293676 A | 11/1998 |
| JP | 2008181297 A | 8/2008 |
| KR | 100877059 B1 | 1/2009 |
| KR | 20090043140 A | 5/2009 |
| KR | 20100025848 A | 3/2010 |

OTHER PUBLICATIONS

1-"Samsung Wave, first bada smartphone hits the market",2011,total 3 pages. Website: http://static.bada.com/contents/mw/pressrelease/samsung-wave-first-bada-smartphone-hits-the-market.html.
2-"Samsung Electronics Announces First Quarter 2010 Results",Seoul, Korea,Apr. 30, 2010,total 2 pages. Website: http://www.samsung.com/us/aboutsamsung/investor_relations/financial_information/IR_Earnings2010_1q.html.
7-"Download page screenshot",website: http://fccid.io/NM8PB99200, and "Your HTC Desire User guide",total 220 pages.
8-"Samsung Wave, first bada smartphone hits the market",The Hardware Authority, May 24, 2010,total 2 pages. Website: http://www.cdrinfo.com/Sections/News/Details.aspx?Newsid=27633.
9-Golam Mostafa,"Samsung Wave, first bada smartphone hits the market", The Techjournal,total 3 pages. Website: https://thetechjournal.com/electronics/mobile/samsung-first-bada-smartphone-samsung-wave-hits-the-market.xhtml.

(56) References Cited

OTHER PUBLICATIONS

"Smartphone Users Manual HTC Desire User Guide HTC Corporation",HTC Corporation Smartphone, Mar. 25, 2010, total 224 pages.
"iPod touch User Guide", for iPhone OS 3.1 Software,2009,total 180 pages.
15-Youtube video screenshot and translation,pubulished on Mar. 25, 2010,total 2 pages.
16-Well-deserved bada Samsung S8500 real machine trial,Apr. 10, 2010,total 23 pages. Website: http://mobile.pconline.com.cn/review/1004/2094718.html.
17-Bada system top ten test Samsung wave S8500 evaluation,Jun. 14, 2010,total 68 pages. Website: http://www.pcpop.com/doc/0/544/544402_all.shtml#p2.
25-Youtube video screenshot and translation,pubulished on Jun. 25, 2010,total 2 pages. https://www.youtube.com/watch?v=rjB9ZKXG7Kc.
Dan Nystedt,"MIPS to Demo Android TV Set-top Box,Netbooks", IDG News Service, Jan. 5, 2010,total 8 pages. http://www.pcworld.com/article/185886/android_set_top_box.html.
Mikael Ricknäs,"Ericsson Demos Android-based Touchscreen Remote",IDG News Service,Feb. 15, 2010,total 8 pages. http://www.pcworld.com/article/189352/Ericsson_Android_Remote.html.
"Google test Android TV operating system set-top box search function", News reports, NetEase technology reported in Mar. 9, 2010, total 3 pages. http://tech.163.com/10/0309/08/61AOQB95000915BF.html.
"Android platform new application mode set-top box", News reports, drive home reported in Apr. 14, 2009,total 3 pages. http://news.mydrivers.com/1/132/132319.htm.
Youtube video screenshot and translation,pubulished on Apr. 25, 2010, total 6 pages. https://www.youtube.com/watch?v=3g4JdZ1NlaY&feature=youtu.be&t=100.
"1 GHz processor, the new bada system Samsung wave S8500 experience", News reports, Sohu digital reported in Mar. 22, 2010,total 5 pages. http://digi.it.sohu.com/20100322/n270994704_3.shtml.
Andriod trademark's screenshot from China Trademark network,total 1 page.
Second Office action from Chinese application No. 201010166490.4,with an English translation,total 4 pages.
Third Office action from Chinese application No. 201010166490.4,with an English translation,total 5 pages.
Fourth Office action from Chinese application No. 201010166490.4,with an English translation,total 6 pages.
Fifth Office action from Chinese application No. 201010166490.4,with an English translation,total 6 pages.
Tony Bove: "iPod touch for Dummies" in: "Making Everything Easier", Jan. 1, 2009,Wiley Publishing, Inc., Hoboken,NJ,total 4 pages.
"How to more conveniently use the Home screen of Galaxy S",Jan. 14, 2011,with an English translation,total 10 pages.
Bob Bhatnagar,"Get More Home Screens on Your iPhone Without Jailbreaking",The iPhone FAQ,Jan. 31, 2010, total 4 pages.
Ken Burkhalter,"Home Screen Icon Control",iPhone Life Magazine, Oct. 31, 2008,total 5 pages.
Daynah,"How to Display 11+ Pages of iPhone Apps",PHP-Princess, Aug. 11, 2009,total 15 pages.
Pbrennan42,"T-Mobile Pulse/Huawei U8220 FAQ", Welcome to the Android Central Forums, Jan. 6, 2010,total 4 pages.
"T-Mobile Pulse", User Manual,2009,total 185 pages.
McKillop, How to add and remove Widgets from your Android hone screen-Simple Help, Jul. 26, 2009, http://www.simplehelp.net/2009/07/26/how-to-add-and-remove-widgets-from-your-android-home-screen/,total 11 pages.
"Samsung Wave S8500 with New Bada OS Firmware, Full HD video," YouTube video, Retrieved from the internet: https://www.youtube.com/watch?v=3g4JdZ1NlaYandfeature=youtu.beandt=100 (Apr. 15, 2010).
"Vesti Telecom—The future depends on you" YouTube video, Retrieved from the internet: https://www.youtube.com/watch?v=1s7K6NDcKqg (Apr. 24, 2010).
"Anteprima Samsung Wave S8500 with new firmware Bada OS, HDblog.it video Full HD," YouTube video, Retrieved from the Internet: https://www.youtube.com/watch?v=XA63bDJJxZU (Apr. 16, 2010).
"Trial use of bada Samsung Wave S8500 real phones that are not fictitious," Retrieved from the internet: https://mobile.pconline.com.cn/review/1004/2094718_all.html#content_page_1 (Apr. 10, 2010).
"News reports: Signed 1 billion USD with the China Development Bank," CCTV Network, Retrieved from the internet: http://news.cntv.cn/20110818/103360.shtml (Aug. 18, 2011).
"Guide to Three Major Mobile Communication Operators in Russia," Retrieved from the internet: "https://www.russia-online.cn/News/000_3_4_30627.shtml," (Sep. 6, 2016).
"МегафоH mobile communication," Retrieved from the internet: "http://www.huae.ru/info/795," (Jun. 20, 2013).
"Uploading a Video," Retrieved from the internet: "https://support.google.com/youtube/answer/57407?hl=zn-Hans" (2019).
"Clip video," Retrieved from the internet: "https://support.google.com/youtube/answer/9057455?hl=zn-Hans" (2019).
CN/201500280914, Notice of Allowance, dated Nov. 7, 2019.
U.S. Appl. No. 13/662,463, filed Oct. 27, 2012.

\* cited by examiner

METHOD AND APPARATUS FOR ADDING ICON TO INTERFACE OF ANDROID SYSTEM, AND MOBILE TERMINAL

CROSS-REFERENCE TO RELATED APPLICATIONS

This application is a continuation of U.S. patent application Ser. No. 13/662,463, filed on Oct. 27, 2012, which is a continuation of International Application No. PCT/CN2011/073430, filed on Apr. 28, 2011, which claims priority to Chinese Patent Application No. 201010166490.4, filed on Apr. 28, 2010, all of which are hereby incorporated by reference in their entireties.

FIELD OF THE INVENTION

The present invention relates to the field of communications technologies, and in particular, to a method and an apparatus for adding an icon to an interface of an Android system, and a mobile terminal.

BACKGROUND OF THE INVENTION

At present, taking a device installed with an Android system as a representative, more and more handheld touch-screen terminal devices provide large-space Home interfaces for users, and therefore, the users are allowed to place, according to their habits and under a precondition that there is space on a current screen, icons of frequently used favorite programs, widgets, controls, folders and so on to the Home interfaces of the devices, resembling shortcuts on a computer desktop, which greatly facilitates searching for a particular application program by the users when functions of handheld devices become increasingly powerful nowadays.

During a process of implementing embodiments of the present invention, the inventor finds that the prior art has the following technical problems: If there is no space for placement on the current screen, an icon cannot be added, and a user is required to manually release space for placement, which is inconvenient for the user to operate; in addition, in the prior art, when an icon is to be added to the Home interface, it must be ensured that there are enough space on the current screen, so that the icon can be added; if there is no enough space, a series of operations of selecting an icon to be added by the user previously are invalid, and need to be performed again. As a result, a capability of intelligent interaction between a mobile phone using an Android system and a user is greatly reduced.

SUMMARY OF THE INVENTION

In view of the foregoing problems, an embodiment of the present invention provides a method for adding an icon to an interface of an Android system, where the Android system has N interfaces, and the method includes:

a. obtaining add command information;

b. obtaining, according to the add command information, space information of an icon to be added;

c. obtaining remaining space information of an $M^{th}$ interface according to the add command information;

d. judging whether the space information of the icon to be added is greater than the remaining space information of the $M^{th}$ interface; if yes, executing step e; if no, executing step f;

e. judging whether the $M^{th}$ interface is a last interface to be judged; if yes, executing step g; if no, assigning M+1 to M and returning to step c;

f. adding the icon to the interface, and the process ends; and g. establishing another interface, adding the icon to the newly established interface, and the process ends;

where, M and N are natural numbers, and $1 \leq M \leq N$.

Meanwhile, an embodiment of the present invention further provides an apparatus for adding an icon to an interface of an Android system, where the Android system has N interfaces, and the apparatus includes:

a first obtaining module, configured to obtain add command information;

a second obtaining module, configured to obtain, according to the add command information, space information of an icon to be added and remaining space information of an $M^{th}$ interface;

a first judging module, configured to judge whether the space information of the icon to be added is greater than the remaining space information of the $M^{th}$ interface;

a second judging module, configured to judge whether the $M^{th}$ interface is a last interface to be judged; and an adding module, configured to add the icon to remaining space of the $M^{th}$ interface when the first judging module judges that the space information of the icon to be added is not greater than the remaining space information of the $M^{th}$ interface;

where, M and N are natural numbers, and $1 \leq M \leq N$.

In the embodiments of the present invention, whether to add the icon to a current interface is determined by judging whether the space information of the icon to be added is smaller than or equal to remaining space information of the current interface, thereby solving a technical problem that a user is required to determine again and again whether there is enough space before adding a icon in an Android device at present, and providing a friendly and human-centered operating experience for the user, so that a capability of intelligent interaction between a mobile phone using an Android system and a user is greatly improved.

BRIEF DESCRIPTION OF THE DRAWINGS

To illustrate the technical solutions in the embodiments of the present invention more clearly, accompanying drawings required for describing the embodiments are briefly introduced in the following. Obviously, the accompanying drawings in the following description are merely some embodiments of the present invention, and persons of ordinary skills in the art may further obtain other drawings according to the accompanying drawings without creative efforts.

DETAILED DESCRIPTION OF THE EMBODIMENTS

The technical solutions in the embodiments of the present invention are clearly and completely described in the following with reference to the accompanying drawings. Evidently, the embodiments to be described are merely part of rather than all of the embodiments of the present invention. All other embodiments obtained by persons of ordinary skill in the art based on the embodiments of the present invention without creative efforts shall fall within the protection scope of the present invention.

Embodiment 1

Figure 1:
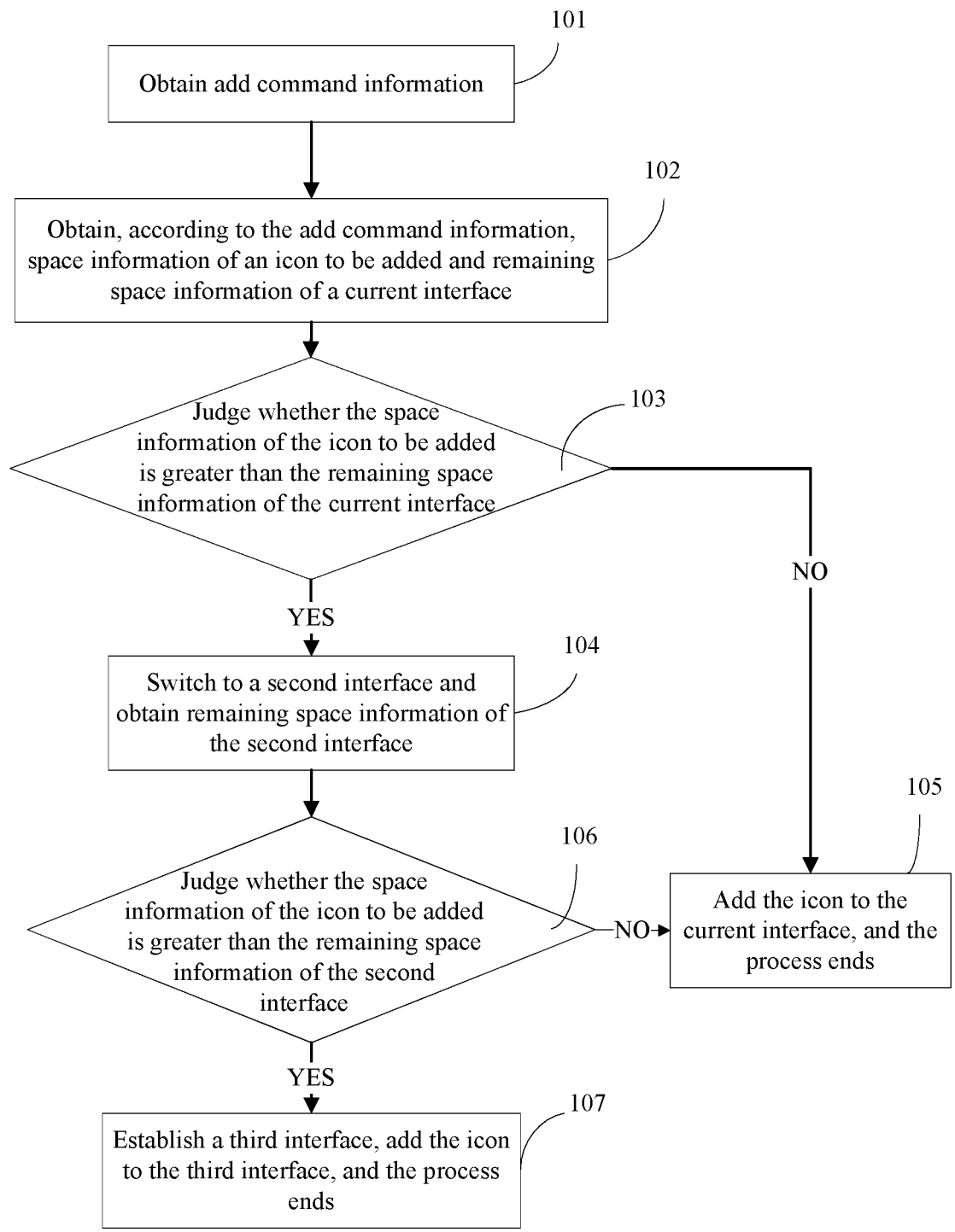
FIG. 1 is a flowchart of a method according to Embodiment 1 of the present invention.

Taking a mobile phone using an Android system with 2 interfaces as an example, Embodiment 1 of the present invention provides a method for adding an icon to an interface of an Android system. Referring to FIG. 1, the method specifically includes:

Step 101: Obtain add command information, where the add command information is command information generated by a mobile terminal system due to a relevant operation of a user when the user needs to move an icon of a certain application program. For example, in a mobile terminal (such as a PC, PDA, and mobile phone) installed with an Android system, when the user presses an icon of a photographing application program, the mobile terminal can obtain the add command information, and determine that the user needs to perform a corresponding add operation on the icon.

Step 102: Obtain, according to the add command information, space information of an icon to be added and remaining space information of a current interface.

The icon mentioned in the embodiment of the present invention specifically refers to icons that are capable of representing visibility or touchability of various application programs, such as a shortcut (shortcut), widget (Widget), folder, sticker, and bookmark. After obtaining the add command information, the mobile terminal obtains, according to the add command information, the space information of the icon to be added. The space information may be two-dimensional plane information, and may also be three-dimensional information. For example, the mobile terminal may obtain an icon with space information being 2×2 square units (such as centimeters). Meanwhile, the mobile terminal may obtain the remaining space information of the current interface. Because the icon to be added needs to be added to the current interface, the mobile terminal needs to determine how much space is left on the current interface. For example, the mobile terminal determines the remaining space information through a grid parameter established by the system itself and information of space that has been occupied by application program icons.

Step 103: Judge whether the space information of the icon to be added is greater than the remaining space information of the current interface; if yes, execute step 104; if no, execute step 105.

For example, the space information of the icon to be added is 2×2 square units, and the remaining space information is 3×2 square units; this square unit takes a horizontal axis—X axis and a longitudinal axis—Y axis of a Cartesian coordinate system as a reference system. The mobile terminal judges that 2<3 and 2≤2, which indicates that the space information of the icon to be added is smaller than or equal to the remaining space information of the current interface. Therefore, the mobile terminal adds the icon to the current interface. Certainly, the space information mentioned in the example is plane information; in the embodiment of the present invention, the space information of the icon and the remaining space information may also be three-dimensional space information. For example, the space information of the icon to be added is 2×2×2 cubic units, and the remaining space information is 3×2×4 cubic units; the mobile terminal judges that 2<3, 2≤2, and 2<4, which indicates that the space information of the icon to be added is smaller than or equal to the remaining space information of the current interface. Therefore, the mobile terminal adds the icon to the current interface; otherwise, the mobile terminal searches for a next interface, and judges whether the next interface has enough remaining space information for adding the icon.

Step 104: Switch to a second interface, obtain remaining space information of the second interface, and execute step 106.

Step 105: Add the icon to the current interface, and the process ends.

Step 106: Judge whether the space information of the icon to be added is greater than the remaining space information of the second interface; if yes, execute step 107; if no, execute step 105.

Step 107: Establish a third interface, add the icon to the third interface, and the process ends.

In Embodiment 1 of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between the mobile phone using the Android system and the user, and providing a friendly and human-centered operating experience for the user, so that the user has a good experience from visual and ease of use perspectives during an operation.

Embodiment 2

Figure 2:
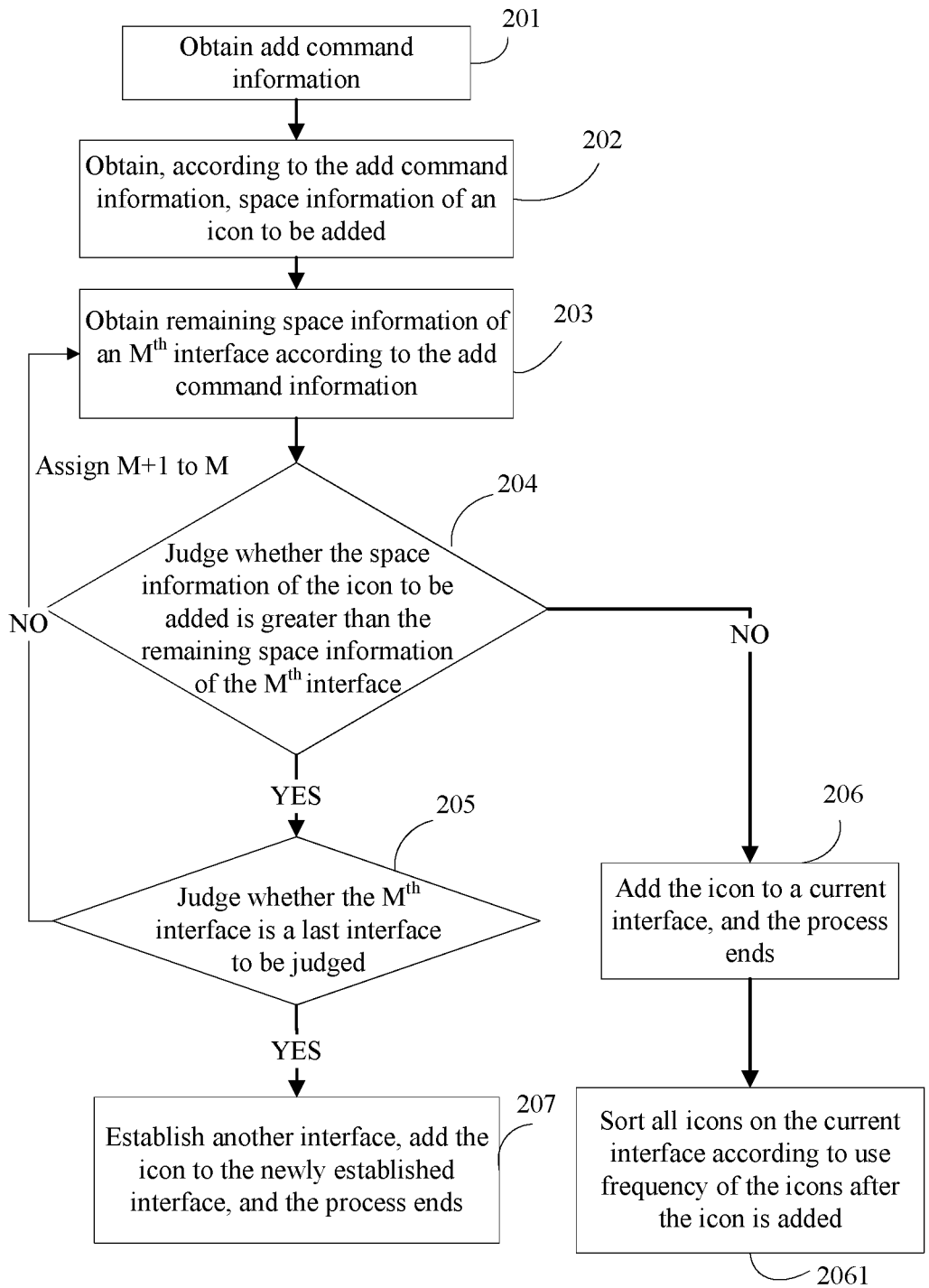
FIG. 2 is a flowchart of a method according to Embodiment 2 of the present invention.

In Embodiment 1, the mobile terminal using the Android system with 2 interfaces is taken as an example for illustration; Embodiment 2 of the present invention is described specifically below by using an Android system with N interfaces. Referring to FIG. 2, Embodiment 2 of the present invention provides a method for adding an icon to an interface of an Android system, and the method specifically includes:

Step 201: Obtain add command information, where the add command information is command information generated by a mobile terminal system due to a relevant operation of a user when the user needs to move an icon of a certain application program. For example, in a mobile terminal (such as a PC, PDA, and mobile phone) installed with an Android system, when the user presses an icon of a photographing application program, the mobile terminal can obtain the add command information, and determine that the user needs to perform a corresponding add operation on the icon.

Step 202: Obtain, according to the add command information, space information of an icon to be added.

Step 203: Obtain remaining space information of an $M^{th}$ interface according to the add command information.

The icon mentioned in the embodiment of the present invention specifically refers to icons that are capable of representing visibility or touchability of various application programs, such as a shortcut (shortcut), widget (Widget), folder, sticker, and bookmark. After obtaining the add command information, the mobile terminal obtains, according to the add command information, the space information of the icon to be added. The space information may be two-dimensional plane information, and may also be three-dimensional information. For example, the mobile terminal may obtain an icon with space information being 2×2 square units (such as centimeters). Meanwhile, the mobile terminal may obtain remaining space information of a current interface. Because the icon to be added needs to be added to the current interface, the mobile terminal needs to determine how much space is left on the current interface. For example, the mobile terminal determines the remaining space information through a grid parameter established by the system itself and information of space that has been occupied by application program icons.

Step 204: Judge whether the space information of the icon to be added is greater than the remaining space information of the $M^{th}$ interface; if yes, execute step 205; if no, execute step 206.

Step 205: Judge whether the $M^{th}$ interface is a last interface to be judged; if yes, execute step 207; if no, assign M+1 to M, and return to step 203.

Step 206: Add the icon to the interface, and the process ends.

Step 207: Establish another interface, add the icon to the newly established interface, and the process ends.

M and N are natural numbers, and $1 \leq M \leq N$.

The following takes a mobile terminal using an Android system with 3 interfaces as an example to describe the foregoing process in detail. A terminal user performs an operation on a corresponding icon; the mobile terminal obtains add command information, and obtains, according to the command information, space information of the icon and remaining space information of a current interface (which may be called a first interface). Then, judge whether the space information of the icon is greater than the remaining space information of the current first interface; if no, add the icon to the current first interface directly; if yes, judge whether the current first interface is a last interface to be judged. An interface to be judged is obtained through a calculation according to interfaces of the system and an interface that has been judged; in the embodiment, because in the judging step, only the first interface is judged, and there are 2 interfaces which are not judged yet, the current first interface is not the last interface to be judged. Therefore, judge a second interface, which is judging whether the space information of the icon is greater than remaining space information of the second interface; if no, add the icon to the second interface directly; if yes, judge whether the second interface is the last interface to be judged. In the embodiment, because in the judging step, only the first interface and the second interface are judged, and there is a third interface which is not judged yet, the second interface is not the last interface to be judged. Therefore, judge the third interface, which is judging whether the space information of the icon is greater than remaining space information of the third interface; if no, add the icon to the third interface directly; if yes, judge whether the third interface is the last interface to be judged. In the embodiment of the present invention, the third interface is the last interface to be judged, which indicates that none of the three interfaces of the system has enough remaining space information for adding and placing the icon. In this case, the system establishes a new interface—which is called a fourth interface. The fourth interface is newly established, and no application program icon is placed on the interface. Therefore, remaining space information of the interface is whole space of the interface, and the icon may be added to the fourth interface. It may be understandable that, in the embodiment of the present invention, the number of interfaces possessed by the mobile terminal using the Android system is not limited to 3, and may also be multiple, and an operation of adding an application program icon to an interface may also be performed according to the foregoing method process.

Optionally, after step 206, the method further includes:

Step 2061: After the icon is added, sort all icons on the current interface according to use frequency of the icons. There may be icons of multiple application programs placed on an interface to which the icon is added. The user sorts and then places these icons and the newly added icon, so that an icon of a most frequently used application program may be placed at a most eye-catching or top position, which facilitates an operation of the user.

In the embodiment of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between a mobile phone using an Android system and the user, and providing a friendly and human-centered operating experience for the user, so that the user has a good experience from visual and ease of use perspectives during an operation.

Embodiment 3

Figure 3:
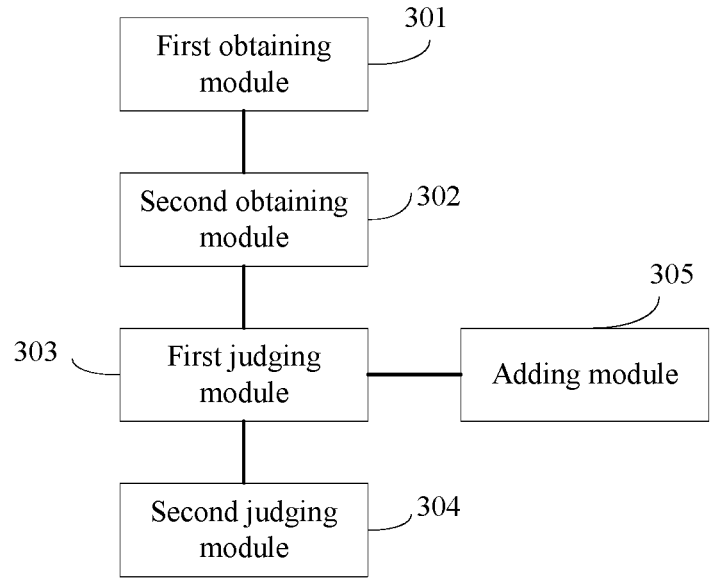
FIG. 3 is a schematic diagram of an apparatus according to Embodiment 3 of the present invention.

Embodiment 3 of the present invention provides an apparatus for adding an icon to an interface of an Android system, where the Android system has N interfaces; referring to FIG. 3, the apparatus includes:

a first obtaining module 301, configured to obtain add command information;

a second obtaining module 302, configured to obtain, according to the add command information, space information of an icon to be added and remaining space information of an $M^{th}$ interface;

a first judging module 303, configured to judge whether the space information of the icon to be added is greater than the remaining space information of the $M^{th}$ interface;

a second judging module 304, configured to judge whether the $M^{th}$ interface is a last interface to be judged; and an adding module 305, configured to add the icon to remaining space of the $M^{th}$ interface when the first judging module judges that the space information of the icon to be added is not greater than the remaining space information of the $M^{th}$ interface;

where, M and N are natural numbers, and $1 \leq M \leq N$.

Figure 4:
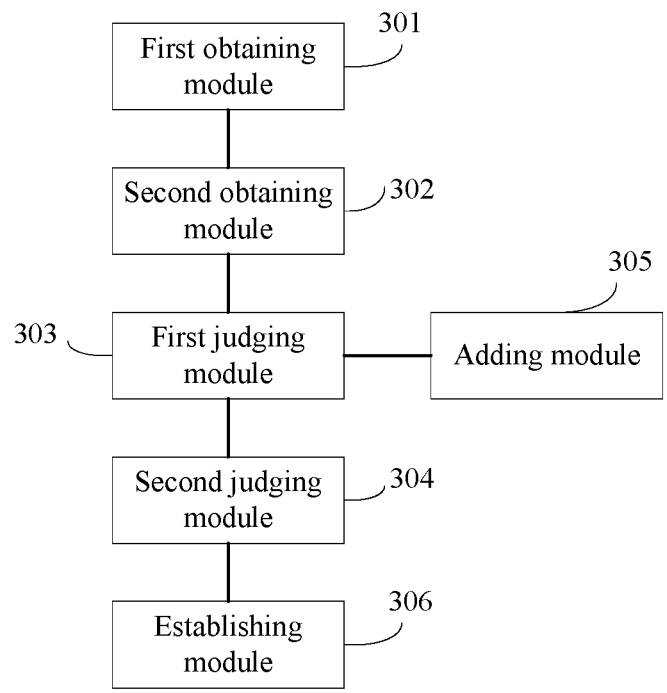
FIG. 4 is another schematic diagram of the apparatus according to Embodiment 3 of the present invention.

Further, referring to FIG. 4, the apparatus may further include:

an establishing module 306, configured to establish another interface when the second judging module judges that the $M^{th}$ interface is the last interface to be judged;

where, the adding module 305 is further configured to add the icon to the newly established interface.

Figure 5:
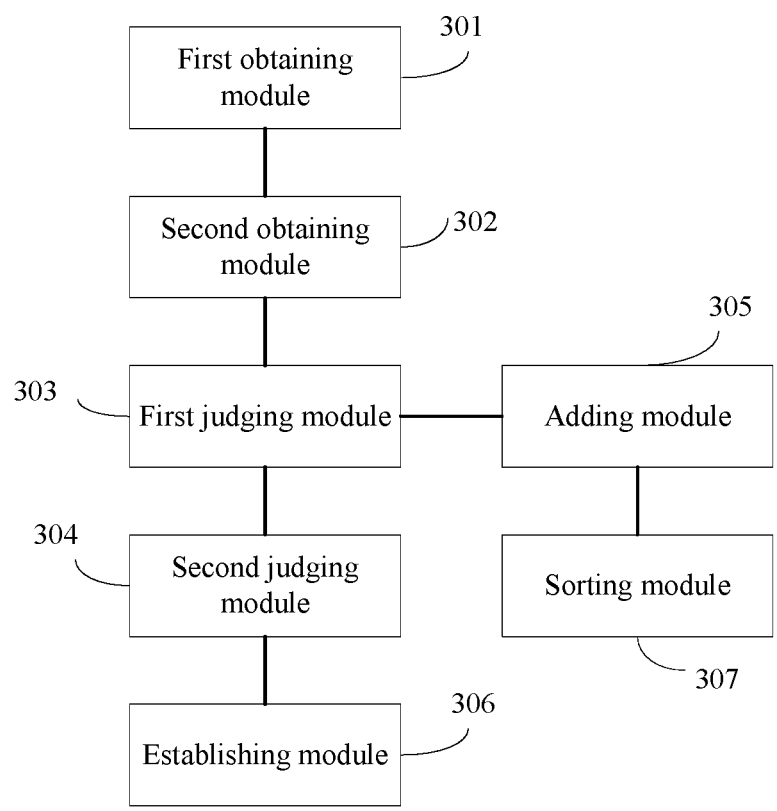
FIG. 5 is another schematic diagram of the apparatus according to Embodiment 3 of the present invention.

Further, referring to FIG. 5, the apparatus may further include:

a sorting module 307, configured to sort all icons on a current interface according to use frequency of the icons and an interface to which the adding module 305 adds the icon. There may be icons of multiple application programs placed on the interface to which the icon is added. A user sorts and then places these icons and the newly added icon, so that an icon of a most frequently used application program may be placed at a most eye-catching or top position, which facilitates an operation of the user.

In the embodiment of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between a mobile phone using an Android system and the user, and providing a friendly and human-centered operating experience for the user, so that the user has a good experience from visual and ease of use perspectives during an operation.

Embodiment 4

Embodiment 4 of the present invention discloses a mobile terminal using an Android system, where the mobile terminal includes a baseband chip, a touch screen, an antenna, and so on, and the mobile terminal may further include the apparatus for adding the icon to the interface in Embodiment 3. Specifically, the mobile terminal may be a terminal device such as a mobile phone using an Android system, a PDA (personal digital assistant), a home information display (Home Information Display, HID), a tablet, or a mobile Internet device (Mobile Internet Device, MID).

Persons of ordinary skill in the art should understand that all or part of the processes of the method according to the foregoing embodiments may be implemented by a computer program instructing relevant hardware. The program may be stored in a computer readable storage medium. When the program is run, the processes of the method according to the foregoing embodiments may be performed. The storage medium may be a magnetic disk, an optical disk, a read-only memory (Read-Only Memory, ROM), a random access memory (Read-Only Memory, RAM), and so on.

The foregoing is merely exemplary embodiments of the present invention, but is not intended to limit the present invention. Any modification, equivalent replacement, or improvement made without departing from the spirit and principle of the present invention shall fall within the protection scope of the present invention.

What is claimed is:

1. A method of adding an icon in a mobile terminal that has a first homescreen, the method being performed by the mobile terminal and comprising:
   detecting a press gesture on an icon for a widget to add the icon for the widget to the first homescreen, wherein a shortcut and a folder are displayed on the first homescreen;
   in response to detecting the press gesture, determining whether the first homescreen has available space for placing the icon for the widget; and
   in response to determining that the first homescreen does not have available space for placing the icon for the widget, displaying the icon for the widget on a second homescreen automatically created next to the first homescreen.

2. The method according to claim 1, further comprising:
   determining remaining space of the first homescreen through a display grid parameter established by an operating system of the mobile terminal and space occupied by application program icons on the first homescreen.

3. The method according to claim 1, wherein:
   the mobile terminal has a third homescreen before detecting the press gesture; and
   the third homescreen does not have available space for placing the icon for the widget.

4. The method according to claim 1, further comprising:
   detecting a second press gesture on an icon for a second widget to add the icon for the second widget to the first homescreen;
   in response to detecting the second press gesture, determining whether the first homescreen has available space for placing the icon for the second widget; and
   in response to determining that the first homescreen does have available space for placing the icon for the second widget, displaying the icon for the second widget on the first homescreen.

5. The method according to claim 1, further comprising:
   detecting a second press gesture on an icon for a second widget to add the icon for the second widget to the first homescreen;
   in response to detecting the second press gesture, determining whether the first homescreen has available space for placing the icon for the second widget;
   in response to determining that the first homescreen does not have available space for placing the icon for the second widget, determining whether a third homescreen has available space for placing the icon for the second widget; and
   in response to determining that the third homescreen does have available space for placing the icon for the second widget, displaying the icon for the second widget on the third homescreen.

6. A mobile terminal comprising:
   a display screen;
   a memory storing instructions, including instructions of an operating system; and
   a processor configured to execute the instructions to perform operations of:
      detecting a press gesture on an icon for a widget to add the icon for the widget to a first homescreen, wherein a shortcut and a folder are displayed on the first homescreen;
      in response to detecting the press gesture, determining whether the first homescreen has available space for placing an icon for a widget; and
      in response to determining that the first homescreen does not have available space for placing the icon for the widget, displaying the icon for the widget on a second homescreen automatically created next to the first homescreen.

7. The mobile terminal according to claim 6, wherein the operations further include:
   determining remaining space of the first homescreen through a display grid parameter established by the operating system and space occupied by application program icons on the first homescreen.

8. The mobile terminal according to claim 6, wherein:
   the mobile terminal has a third homescreen before the detecting the press gesture; and
   the third homescreen does not have available space for placing the icon for the widget.

9. The mobile terminal according to claim 6, wherein the operations further include:
   detecting a second press gesture on an icon for a second widget to add the icon for the second widget to the first homescreen;

in response to detecting the second press gesture, determining whether the first homescreen has available space for placing the icon for the second widget; and in response to determining that the first homescreen does have available space for placing the icon for the second widget, displaying the icon for the second widget on the first homescreen.

10. The mobile terminal according to claim 6, wherein the operations further include:

detecting a second press gesture on an icon for a second widget to add the icon for the second widget to the first homescreen;

in response to detecting the second press gesture, determining whether the first homescreen has available space for placing the icon for the second widget;

in response to determining that the first homescreen does not have available space for placing the icon for the second widget, determining whether a third homescreen has available space for placing the icon for the second widget; and in response to determining that the third homescreen does have available space for placing the icon for the second widget, displaying the icon for the second widget on the third homescreen.

11. A non-transitory computer-readable storage medium having a program recorded thereon that, when executed by a processor, causes a mobile terminal to add an icon in a mobile terminal that has a first homescreen, by performing the steps of:

detecting a press gesture on an icon for a widget to add the icon for the widget to the first homescreen, wherein a shortcut and a folder are displayed on the first homescreen;

in response to detecting the press gesture, determining whether the first homescreen has available space for placing the icon for the widget; and in response to determining that the first homescreen does not have available space for placing the icon for the widget, displaying the icon for the widget on a second homescreen automatically created next to the first homescreen.

12. The non-transitory computer-readable storage medium according to claim 11, wherein:

the mobile terminal has a third homescreen before the detecting the press gesture; and the third homescreen does not have available space for placing the icon for the widget.

13. The non-transitory computer-readable storage medium according to claim 11, wherein the steps further include:

detecting a second press gesture on an icon for a second widget to add the icon for the second widget to the first homescreen;

in response to detecting the second press gesture, determining whether the first homescreen has available space for placing the icon for the second widget; and in response to determining that the first homescreen does have available space for placing the icon for the second widget, displaying the icon for the second widget on the first homescreen.

14. The non-transitory computer-readable storage medium according to claim 11, wherein the steps further include:

detecting a second press gesture on an icon for a second widget to add the icon for the second widget to the first homescreen;

in response to detecting the second press gesture, determining whether the first homescreen has available space for placing the icon for the second widget;

in response to determining that the first homescreen does not have available space for placing the icon for the second widget, determining whether a third homescreen has available space for placing the icon for the second widget; and in response to determining that the third homescreen does have available space for placing the icon for the second widget, displaying the icon for the second widget on the third homescreen.

* * * * *